United States Patent Office

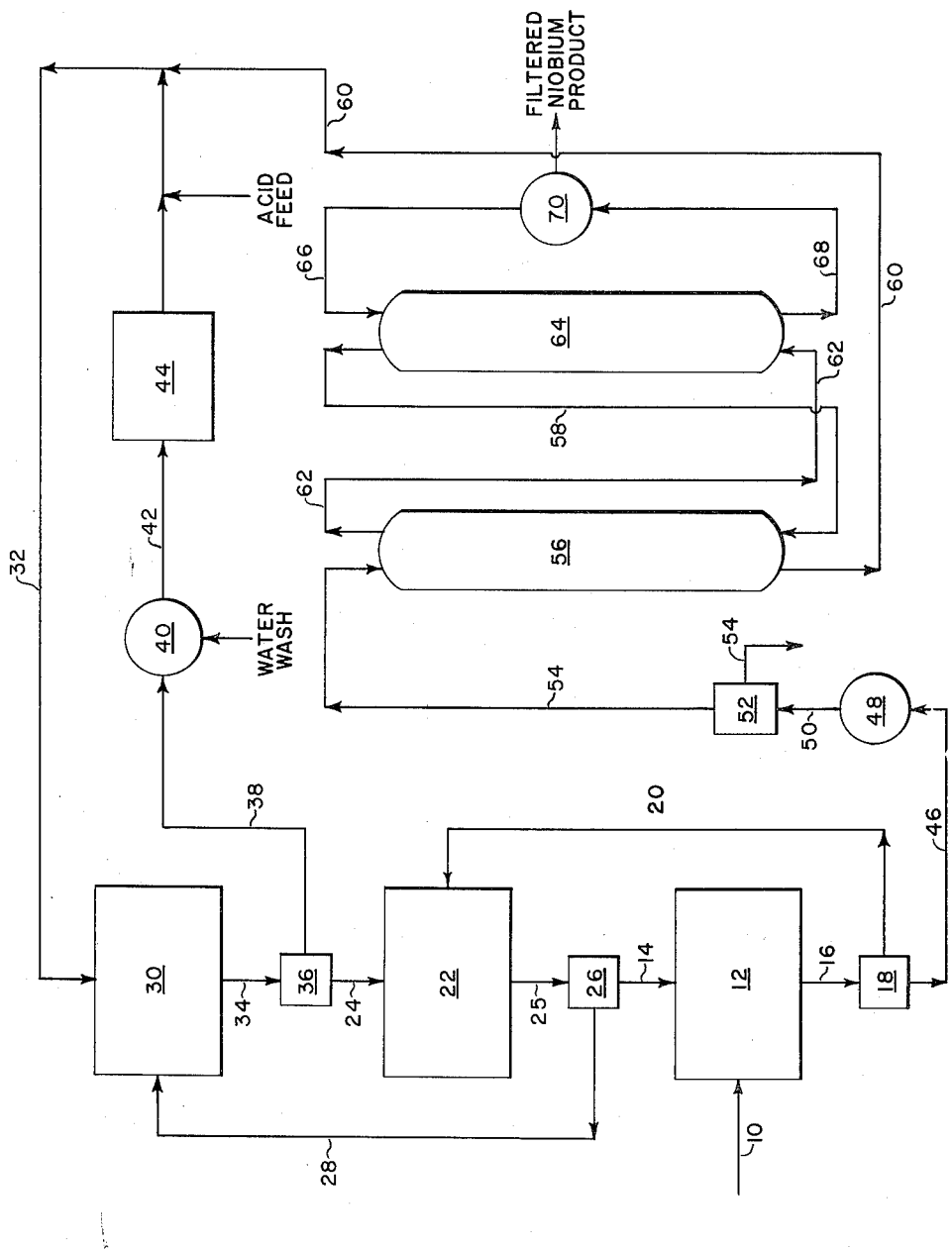

3,025,157
Patented Mar. 13, 1962

3,025,157
PROCESS FOR RECOVERY OF NIOBIUM FROM ORES IN ASSOCIATION WITH ALKALINE EARTH METALS
Bernard J. Lerner, Pittsburgh, Pa., assignor to Gulf Research & Development Company, Pittsburgh, Pa., a corporation of Delaware
Filed May 22, 1959, Ser. No. 815,063
7 Claims. (Cl. 75—115)

This invention relates to the recovery of niobium from ores containing the same.

The element niobium, also commonly referred to as columbium, occurs in a great variety of ores. The commercial value of niobium in metallurgy makes desirable its recovery in relatively concentrated form from ores containing it including the low grade ores which contain only relatively small quantities of the metal. To accomplish recovery of the desired niobium metal it is necessary to decompose the mineral ore and convert the niobium to a form in which it can be separated from other undesired constituents of the ore.

In the prior art certain niobium containing ores, generally ores of the columbite-tantalite type, are roasted at temperatures on the order of 600-800° C. to convert the niobium compounds to acid-susceptible oxides. The roasted materials are then treated with strong mineral acids such as concentrated sulfuric at high temperatures to effect decomposition of the oxides. The columbite-tantalite type ores are generally readily concentrated by standard physical methods to yield concentrates containing relatively high amounts of niobium. These concentrates are ordinarily subjected to the treatment with sulfuric acid. In addition to the columbite-tantalite type ores in which the niobium occurs as a niobate, the element niobium occurs in a number of other ores such as for example, the pyrochlore, koppite and niocalite type ores. These ores usually contain appreciable quantities of alkaline earth metals such as calcium and magnesium together with varying amounts of niobium depending upon the quality of the ore. Moreover, the niobium in these ores occurs not as a simple niobate but as complex basic salts such as the oxy-halides. Typical low-grade ores of the pyrochlore type may contain for example from 2 to 20 percent calcium and from 0.05 to 1 percent niobium. High quality ores or concentrates would, of course, contain higher percentages of the niobium. The use of concentrated sulfuric acid in the decomposition of this type of ore results in excessive acid consumption. In the process of decomposing the ore, the concentrated sulfuric acid reacts with the calcium or other alkaline earth metals present therein to form large quantities of sulfate salts. The sulfate salts formed such as calcium sulfate are highly soluble in concentrated sulfuric acid at elevated temperatures. However, upon cooling the acid solution, the sulfate salts precipitate producing a thick cementitious paste or gel which presents considerable difficulty in handling and which also prevents efficient separation and recovery of sulfuric acid. Because of the large bulk of material to be treated in the case of low grade ores, particularly ores containing large quantities of alkaline earth metals, it is of greatest importance to an economically sound process that reagent costs be minimized.

The present invention provides a process wherein niobium can be conveniently and economically separated from ores containing it. By the novel process of the invention, niobium is effectively recovered from the ores containing it with minimum acid consumption and without the use of expensive organic reagents ordinarily utilized to extract the niobium from the ore. The process of the invention is particularly suitable for treating ores containing minor amounts of niobium together with substantial amounts such as for example, 10 percent or more of alkaline earth metals.

According to the process of the present invention the niobium containing ore is digested in a number of successive stages with dilute sulfuric acid. In each stage the ore is digested with the dilute sulfuric acid under conditions and for a time sufficient to cause dissolution of a relatively small proportion of the ore in the acid. The ore is digested initially with dilute sulfuric acid of the concentration specified herein which has already been employed to digest ore in a later digestion stage and as a result contains some niobium in solution. The ore undergoing treatment passes through the system countercurrent to the sulfuric acid so that in successive digestion stages it meets sulfuric acid of less niobium content. After digestion of the ore in the various stages, the sulfuric acid containing substantially all of the niobium originally present in the ore is separated from the digested ore and subjected to processing to remove the niobium therefrom and is then recycled for treatment of additional ore. The ore from which the niobium has been removed is discarded from the system. In this manner of operation niobium is selectively recovered in quantitative amounts from ores containing the same while attack on the gangue constituents of the ore is minimized, thus affording considerable reduction in the amounts of sulfuric acid required for treating the ores. A further advantage of the invention is that it provides a continuous process for recovering niobium from ores utilizing a simple plant as will be appreciated from the following description.

The concentration of sulfuric acid employed for digestion of the niobium containing ores is an important feature of the invention. It has been found that by treating niobium containing ores with dilute sulfuric acid in a plurality of stages as disclosed herein, substantially all of the niobium dissolves or is suspended in the acid and removed from the ore while secondary attack of the acid on other undesired constituents of the ore such as the alkaline earth metal constituents is maintained at a minimum. In general, the concentration of the sulfuric acid employed for treating the ores in accordance with the invention ranges from about 35 to 75 percent by weight, a preferred concentration range for the sulfuric acid is the range from about 50–75 percent by weight. The use of sulfuric acid of concentration appreciably above about 75 percent is to be avoided because of excessively high acid consumption due to the fact that hot concentrated sulfuric acid reacts with the gangue constituents of the ore with the formation of large quantities of alkaline earth sulfates and bisulfates. Upon precipitation of the alkaline earth sulfates and bisulfates a proportion of the sulfuric acid is maintained within the precipitated mass of solids resulting in major amounts of additional acid loss. These sulfates and bisulfates can not readily be washed with water to recover acid because an appreciable portion of the precipitates are water-soluble. The surprising discovery that dilute sulfuric acid effectively removes niobium from niobium containing ores leads to numerous processing advantages the foremost of which is the significant reduction in the amount of sulfuric acid consumed in treating such ores. The significant reduction in acid consumption achieved with the use of dilute sulfuric acid is directly attributable to the reduction in secondary gangue attack.

The process of the invention is described in further detail with reference to the drawing which shows diagrammatically in the form of a flow sheet suitable apparatus for practice of the invention.

With reference to the drawing, assuming that the plant is in operation, the niobium containing ore to be treated is delivered from a source (not shown) through line 10 to digester 12. Sulfuric acid is delivered to digester 12 through line 14 for the first stage of digestion. The sulfuric acid which is employed in digester 12 comprises the effluent from a later digestion stage and contains a relatively high percentage of niobium. After the first stage of digestion in digester 12 the slurry of ore and acid is passed through line 16 to a settling tank or centrifuge 18 for separation of the ore and acid. From settling tank or centrifuge 18 the ore is passed through line 20 to digester 22 for a second stage of digestion. The sulfuric acid employed in digester 22 is delivered thereto through line 24 and comprises the effluent from a still later digestion stage. Thus, the sulfuric acid employed in the second stage of digestion in digester 22 is also partly charged with niobium but to a lesser concentration than the sulfuric acid employed in the first digestion stage (digester 12). Following digestion in digester 22 the ore slurry passes via line 25 to settling tank or centrifuge 26 wherein the acid is separated from the ore. The sulfuric acid leaving settling tank or centrifuge 26 is passed to the first stage of digestion in digester 12 through line 14. The ore from settling tank or centrifuge 26 is passed through line 28 to digester 30 for a third digestion stage. The sulfuric acid employed in digester 30 is supplied thereto through line 32 and is fresh or recycled sulfuric acid containing little or no niobium. After digestion in digester 30, the ore slurry is passed via line 34 to a settling tank or centrifuge 36 for separation of acid and ore. The sulfuric acid leaving centrifuge 36 is passed to the second stage of digestion in digester 22 through line 24. The ore residue from centrifuge 36 is passed through line 38 to wash tank 40 wherein the ore is washed with water to insure complete removal of sulfuric acid. From wash tank 40 the water wash together with the sulfuric acid removed from the ore is passed through line 42 to evaporator 44 wherein the water is removed to concentrate the sulfuric acid to a level suitable for use.

It will be seen that the ore undergoing treatment passes through a plurality of digestion stages in succession and is treated in each stage with dilute sulfuric acid, the condition of the acid being different in each stage. The ore which enters digestion stage 1 contains the highest proportion of niobium; that which enters digestion stage 2 has a lower niobium content, some of the niobium having been removed by the acid in stage 1; and that which enters digestion stage 3 has a still lower niobium content.

As already indicated, the niobium content of the sulfuric acid is lowest in stage 3 and highest in stage 1. In other words, as the ore passes from stage to stage its niobium content decreases and it meets sulfuric acid of lower niobium content.

The sulfuric acid which leaves digester 12 (digestion stage 1) contains niobium together with very minor amounts of acid reactable constituents of the ore other than the desired niobium. Although in the present invention the secondary attack on the undesired ore constituents is greatly minimized there may be some reaction between the sulfuric acid and ore constituents such as iron, calcium, aluminum and the like, with the formation of small amounts of these metal sulfates. To remove these impurities the niobium enriched sulfuric acid from centrifuge 18 is passed via line 46 to settling tank 48. In settling tank 48 the temperature of the sulfuric acid is lowered sufficiently to cause precipitation of the sulfates of iron, magnesium, calcium or other impurity metals. If desired or necessary, the precipitation of the salts of these impurity metals may be facilitated by seeding the sulfuric acid solution with crystals of calcium or iron sulfate or the like. The niobium, however, remains dissolved in the sulfuric acid. Separation of the precipitated impurities is accomplished by passing the sulfuric acid solution through line 50 to filter 52. The precipitated impurities leave filter 52 through line 54 and may be recovered for use as "seed" crystals in clarification tank 48. The sulfuric acid solution from filter 52 containing the niobium is passed via line 54 to the upper portion of solvent extraction tower 56. The sulfuric acid passes downwardly through tower 56 countercurrently to a preferential solvent for the niobium which is introduced into the lower part of the tower 56 through line 58. Suitable solvents such as for example, organic phosphate esters, fatty amines capable of preferentially extracting the niobium from the sulfuric acid can be utilized in tower 56.

The niobium can be recovered from the sulfuric acid solution by means other than solvent extraction such as for example, ion-exchange resin chromatography, hydrolysis, and the like, but solvent extraction is a preferred method for recovering the niobium. The sulfuric acid freed of niobium leaves tower 56 through line 60 and is recycled to digester 30 (digestion stage 3). The solvent extract containing the niobium leaves the top of the tower 56 and is passed via line 62 to stripping tower 64 wherein the niobium is stripped from the solvent utilizing as the stripping medium water or a base such as ammonium hydroxide, sodium hydroxide or the like. The stripping medium is introduced through line 66 into the top of stripping tower 64 and is passed countercurrently to the niobium containing solvent. The stripping medium strips the niobium from the solvent and precipitates it as niobic acid and leaves tower 64 through line 68 and is filtered in filter 70 to give as a final product niobic acid. The niobic acid may then be calcined to yield niobium oxide.

In each digestion stage a proportion of the niobium present in the ore is dissolved by the sulfuric acid treating agent. The amount of niobium dissolved in each digestion stage is determined to a great extent by the operating conditions, acid concentration, acid to ore ratio, temperature and time of digestion. Ordinarily, a higher proportion of niobium is dissolved in each digestion stage when severe operating conditions are employed for the digestion. While these operating conditions are relatively critical and important with respect to the efficiency of niobium recovery they are interdependent and susceptible to some variation. Thus, for example, by employing a high ratio of acid to ore, higher temperatures and longer periods of digestion, the number of digestion stages can be reduced. Similarly, with the employment of milder operating conditions, the number of digestion stages is increased in order to obtain maximum recovery of the niobium from the ore. In general, it can be said that the degree of secondary attack of the sulfuric acid on gangue constituents of the ore is greater when more severe operating conditions are employed. For these reasons, it is preferred to employ a greater number of digestion stages utilizing less severe operating conditions. It is preferred also to employ substantially the same operating conditions in each stage. For any desired operation, the operating conditions can be controlled by the operator to provide maximum niobium recovery with greatest economy. In a preferred manner of operation three digestion stages are employed with the digestion in each stage being effected with sulfuric acid of a concentration from about 35 to 75 percent, and preferably from about 50 to 75 percent for a period of about 0.5 to 4 hours. The amount of acid employed for digestion of the ore is such to provide an acid to ore ratio of from about 0.5 to 2:1 or higher by weight based on anhydrous acid content. The digestion operation is carried out at an elevated temperature, preferably at a temperature near the boiling point of the dilute sulfuric acid utilized for digestion of the ore. Thus, in general, the ore digestion is effected at temperatures ranging from about 110° C. in the case of 35 percent acid to about 185° C. in the case of 75 percent acid. The use of dilute sulfuric acid makes it possible to use lower temperatures during the digestion operation than is possible for concentrated sulfuric acid. The temperature required is lowered as much as 100° C. or more. To avoid exceeding the upper limit of the acid concentration specified herein due to evaporation of the water content of the acid the digestion operation can be conducted under reflux conditions or alternately make-up water can be added as required.

For most efficient digestion of the ore it is preferred that the ore be in a finely divided state. In general, the particle size of the ore should be within the range of from about 1/50 of an inch to 1/200 of an inch.

In order to maintain the amount of acid required for treating the ore at a minimum, it is advantageous to first process the ores to remove therefrom acid decomposable alkaline constituents such as carbonates, silicates and aluminates which are usually associated with the ores and which would consume large quantities of sulfuric acid. Such prior processing methods for the ores do not form a part of this invention. One preferred method for removing such acid consuming constituents involves treating the ore with sulfur dioxide and is described in applicant's copending application Serial No. 795,129, filed February 24, 1959.

After digestion of the ore is complete the ore is washed to recover acid and the ore can be discarded or further processed to remove other constituents therefrom.

The process of the invention accomplishes the recovery of niobium from niobium containing ores under conditions resulting in a minimum consumption of sulfuric acid and without the use of relatively expensive organic reagents. The advantages of the process are shown in Table I. Columns 1 and 2 in the table each give data on the process described and claimed herein. For comparison column 3 gives data on the treatment of the ore with concentrated sulfuric acid as known in the prior art. In the process reported in column 3, the ore is treated in a single stage with concentrated sulfuric acid (96 percent by weight).

*Table I*

| Run Number | 1 | 2 | 3 |
|---|---|---|---|
| Ore: | | | |
| Percent Niobium (X-Ray Fluorescent Spectrometer Method) | 0.41 | 0.40 | 0.32 |
| Spectrographic Analysis: | | | |
| Major: Calcium, Silicon, Iron, Aluminum | | | |
| 1-10%: Potassium, Magnesium | | | |
| 0.1-1%: Sodium, Strontium, Titanium, Manganese | | | |
| 0.01-0.1%: Zirconium, Barium, Niobium, Rubidium | | | |
| Treatment of Ore: | | | |
| No. of Stages | 3 | 3 | 1 |
| Minutes per Stage | 60 | 30 | 15 |
| Temperature, °C | 129 | 122 | 250 |
| Sulfuric Acid Employed: | | | |
| Concentration | 53.0 | 52.0 | 96.0 |
| Acid to Ore Ratio | 2.0 | 0.5 | 6.0 |
| Treated Ore Residue: | | | |
| Percent Weight Loss | 9.2 | 8.4 | 29.0 |
| Percent Niobium Removal | 92.0 | 77.6 | 75.3 |

As seen from the data presented in Table I, niobium is effectively recovered from niobium containing ores by treating the ores with dilute sulfuric acid in a plurality of stages as disclosed herein. It is seen also from the above data that the weight loss of the ore treated with dilute sulfuric acid is much less than in the case of the ore treated with concentrated sulfuric acid. The additional weight loss of ore as a result of treatment with sulfuric acid is attributable to the attack of the strong acid on gangue constituents of the ore and is a measure of the corresponding increase in acid consumption.

It will be appreciated from the foregoing that the invention provides a highly practical and inexpensive method of treating niobium containing ores. The method of the invention is particularly suited for treating ores which contain niobium together with appreciable quantities of alkali earth compounds, such as for example, ores of the type exemplified by pyrochlore, koppite, niocalite, hatchellolite, microlite, betafite and perovskite and the like.

It will be apparent that various modifications and variations can be made in applying the teachings of the invention. For example, the number of ore digestion stages can be varied as previously indicated. Likewise, the niobium values can be recovered from the sulfuric acid treating agent by means other than solvent extraction as for example by hydrolysis, chromatographic separation methods or the like. Accordingly, those modifications and equivalents which fall within the spirit of the invention and the scope of the appended claims are to be considered part of the invention.

I claim:

1. A process for recovery of niobium from an ore containing niobium in association with alkaline earth metals which comprises digesting said ore in a plurality of successive stages with sulfuric acid of a concentration from about 35 to about 75 percent by weight, the digestion in each stage being carried out for a time and at a temperature sufficient to cause dissolution of a substantial portion of the niobium in the sulfuric acid, the said sulfuric acid utilized in each digestion stage being of progressively lower concentration in the niobium, the niobium containing ore being introduced into the first digestion stage wherein concentration of niobium in the sulfuric acid is maximum and being withdrawn from a last digestion stage in which said concentration is minimum, said ore being separated from the sulfuric acid treating agent after digestion in each stage and passed to a later digestion stage while the separated sulfuric acid of each digestion stage is passed to a prior digestion stage, the treated ore after digestion with the sulfuric acid in the last stage in which the ore is to be treated being separated from the sulfuric acid and discharged from the system, the sulfuric acid treating agent having the maximum niobium content being withdrawn from the first digestion stage and separated from treated ore and then being subjected to further processing to remove the niobium therefrom.

2. The process of claim 1 wherein the concentration of the sulfuric acid employed for digestion of the ore is from about 50 to about 75 percent.

3. A process for recovery of niobium from an ore containing niobium in association with alkaline earth metals which comprises digesting said ore in a plurality of successive stages with sulfuric acid of a concentration from about 35 to about 75 percent by weight, the digestion in each stage being carried out for a period of from about 0.5 to 4 hours at a temperature of about 110° C. to 185° C. utilizing an acid to ore ratio of about 0.5:1 to 2:1, the said sulfuric acid utilized in each digestion stage being of progressively lower concentration in the niobium, the niobium containing ore being introduced into the first digestion stage wherein concentration of niobium in the sulfuric acid is maximum and being withdrawn from a last digestion stage in which said concentration is minimum, said ore being separated from the sulfuric acid treating agent after digestion in each stage and passed to a later digestion stage while the separated sulfuric acid of each digestion stage is passed to a prior digestion stage, the treated ore after digestion with the sulfuric acid in the last stage in which the ore is to be treated being separated from the sulfuric acid and discharged from the system, the sulfuric acid treating agent having the maximum niobium content being withdrawn from the first digestion stage and separated from treated ore and then being subjected to further processing to remove the niobium therefrom.

4. A process for recovery of niobium from a pyrochlore ore which comprises digesting said ore in a plurality of successive stages with sulfuric acid of a concentration from about 50 to about 75 percent by weight, the digestion in each stage being carried out for a period of from about 0.5 to 4 hours at a temperature of about 110° C. to 185° C. utilizing an anhydrous acid to ore ratio of about 0.5:1 to 2:1, the said sulfuric acid utilized in each digestion stage being of progressively lower concentration in the niobium, the niobium containing being introduced into the first digestion stage wherein concentration of niobium in the sulfuric acid is maximum and being withdrawn from a last digestion stage in which said concentration is minimum, said ore being separated from the sulfuric acid treating agent after digestion in each stage and passed to a later digestion stage while the separated sulfuric acid of each digestion stage is passed to a prior digestion stage, the treated ore after digestion with the sulfuric acid in the last stage in which the ore is to be treated being separated from the sulfuric acid and discharged from the system, the sulfuric acid treating agent having the maximum niobium content being withdrawn from the first digestion stage and separated from treated ore and then being subjected to further processing to remove the niobium therefrom.

5. A process for recovery of niobium from an ore containing niobium in association with alkaline earth metals which comprises digesting said ore in a plurality of successive stages with sulfuric acid of a concentration from about 35 to 75 percent by weight, the digestion in each stage being carried out for a time and at a temperature sufficient to cause dissolution of a substantial portion of the niobium in the sulfuric acid, the said sulfuric acid utilized in each digestion stage being of progressively lower concentration in the niobium, the niobium containing ore being introduced into the first digestion stage wherein concentration of niobium in the sulfuric acid is maximum and being withdrawn from a last digestion stage in which said concentration is minimum, said ore being separated from the sulfuric acid treating agent after digestion in each stage and passed to a later digestion stage while the separated sulfuric acid of each digestion stage is passed to a prior digestion stage, the treated ore after digestion with the sulfuric acid in the last stage in which the ore is to be treated being separated from the sulfuric acid and discharged from the system, the sulfuric acid treating agent having the maximum niobium content being withdrawn from the first digestion stage and separated from treated ore and the so-separated sulfuric acid being then contacted with a solvent to extract the niobium and then being recycled for digestion of additional ore.

6. A process for recovery of niobium from a pyrochlore ore which comprises digesting said ore in a plurality of successive stages with sulfuric acid of a concentration from about 35 to 75 percent by weight, the digestion in each stage being carried out for a time and at a temperature sufficient to cause dissolution of a substantial portion of the niobium in the sulfuric acid, the said sulfuric acid ultilized in each digestion stage being of progressively lower concentration in the niobium, the niobium containing ore being introduced into the first digestion stage wherein concentration of niobium in the sulfuric acid is maximum and being withdrawn from a last digestion stage in which said concentration is minimum, said ore being separated from the sulfuric acid treating agent after digestion in each stage and passed to a later digestion stage while the separated sulfuric acid of each digestion stage is passed to a prior digestion stage, the treated ore after digestion with the sulfuric acid in the last stage in which the ore is to be treated being separated from the sulfuric acid and discharged from the system, the sulfuric acid treating agent having the maximum niobium content being withdrawn from the first digestion stage and separated from treated ore and the so-separated sulfuric acid being then contacted with a solvent to extract the niobium and then being recycled for digestion of additional ore.

7. A process for recovery of niobium from an ore containing niobium in association with alkaline earth metals which comprises digesting said ore in three stages with sulfuric acid of a concentration from about 35 to 75 percent by weight, the digestion in each stage being carried out for a period of from about 0.5 to 4 hours at a temperature of about 110° C. to 185° C. utilizing an anhydrous acid to ore ratio of about 0.5:1 to 2:1, the said sulfuric acid utilized in each digestion stage being of progressively lower concentration in the niobium, the niobium containing ore being introduced into the first digestion stage wherein concentration of niobium in the sulfuric acid is maximum and being withdrawn from a last digestion stage in which said concentration is minimum, said ore being separated from the sulfuric acid treating agent after digestion in each stage and lead to a later digestion stage while the separated sulfuric acid of each digestion stage is passed to a prior digestion stage, the treated ore after digestion with the sulfuric acid in the last stage in which the ore is to be treated being separated from the sulfuric acid and discharged from the system, the sulfuric acid treating agent having the maximum niobium content being withdrawn from the first digestion and separated from treated ore and then being subjected to further processing to remove the niobium therefrom.

References Cited in the file of this patent

UNITED STATES PATENTS

| | | |
|---|---|---|
| 1,467,516 | Tainton | Sept. 11, 1923 |
| 2,259,396 | Schlecht et al. | Oct. 14, 1941 |
| 2,842,424 | Schornstein et al. | July 8, 1959 |
| 2,888,320 | McCord | May 26, 1959 |

OTHER REFERENCES

Mellor: Comprehensive Treatise on Inorganic and Theoretical Chemistry, 1929, volume 9, page 859.